United States Patent [19]
Tsubakimoto et al.

[11] 3,945,980
[45] Mar. 23, 1976

[54] PROCESS FOR PRODUCING FINELY DIVIDED HARDENED RESINS

[75] Inventors: Tsuneo Tsubakimoto; Iwao Fuzikawa, both of Toyonaka, Japan

[73] Assignee: Nippon Shokubai Kazaku Kogyo Co. Ltd., Osaka, Japan

[22] Filed: Oct. 2, 1973

[21] Appl. No.: 402,759

[30] Foreign Application Priority Data
Oct. 4, 1972 Japan.............................. 47-98956

[52] U.S. Cl. ...... 260/39 P; 260/29.4 R; 260/67.6 R
[51] Int. Cl............................................. C08g 51/04
[58] Field of Search ............ 260/29.4 R, 39 P, 67.6, 260/67.6 R

[56] References Cited
UNITED STATES PATENTS

| | | | |
|---|---|---|---|
| 2,119,189 | 5/1938 | Widmer.......................... | 260/39 P X |
| 2,938,873 | 5/1960 | Kozenas ........................ | 260/39 P X |
| 3,303,168 | 2/1967 | Kozenas ........................ | 260/39 P X |
| 3,428,607 | 2/1969 | Renner....................... | 260/29.4 R X |
| 3,454,529 | 7/1969 | Casebolt ........................ | 260/67.6 R |

*Primary Examiner*—Donald E. Czaja
*Assistant Examiner*—S. M. Person
*Attorney, Agent, or Firm*—Sherman & Shalloway

[57] ABSTRACT

A process for preparing a suspension of a finely divided hardened resin which comprises, in combination, the steps of reacting in an aqueous medium at a pH of 5–10 a member selected from the group consisting of benzoguanamine and a mixture of 100–50% by weight of benzoguanamine and 0–50% by weight of melamine with formaldehyde in a ratio of 1 mole of the former to 1.2–3.5 moles of the latter to prepare an aqueous liquid of a soluble and fusible resin having a degree of modified water tolerance of 0–150%, introducing this aqueous liquid to an aqueous solution of protective colloid with stirring to prepare an emulsion of a soluble and fusible resin, adding a curing catalyst to said emulsion, followed by holding same for at least one hour at a temperature in the range of 40°–60°C., and thereafter heating the emulsion at a temperature in the range of 60°–200°C. under normal atmospheric or superatmospheric pressure to effect the hardening of the resin.

9 Claims, No Drawings

PROCESS FOR PRODUCING FINELY DIVIDED HARDENED RESINS

This invention relates to a process for producing a finely divided hardened resin derived from the benzoguanamine type resin.

Processes for producing finely divided hardened resins by adding a curing catalyst such as sulfuric acid to an aqueous solution of an amino resin obtained by reacting either melamine or urea with formaldehyde and then curing the resin with stirring have been known in the past. However, these known processes possessed a number of shortcomings, since the amino resins would rapidly harden in the presence of the curing catalyst to become insoluble and infusible. For instance, in these processes it is necessary to conduct the hardening operation under strictly controlled conditions for obtaining a finely divided hardened resin having a uniform particle size. And even though the operation is carried out under such conditions, it still is difficult to make the particle size uniform. Further, when it is intended to produce colored finely divided hardened resins, there are imposed such restrictions as to the class of dye that can be used and the time of its use in the case of the conventional processes, it being possible to obtain colored finely divided hardened resins only by a procedure consisting of adding a water-soluble dyestuff when the amino resin is in an aqueous solution state and then hardening the resin. Moreover, when the dye is one which exhibits acidity, the hardening of the resin is accelerated by the addition of such a dye to form an insoluble and infusible hardened resin, with the consequence that the dyeing becomes unsatisfactory.

It is therefore an object of the present invention to provide a process by which colored or uncolored finely divided hardened amino resins of an uniform particle size can be produced without the accompaniment of the shortcomings such as seen in the case of the conventional processes. Other objects and advantages of the invention will become apparent from the following description.

According to this invention, a suspension of the intended finely divided hardened resin can be obtained by the following procedure. Formaldehyde and either benzoguanamine or a mixture of 100 – 50 weight % of benzoguanamine and 0 – 50 weight % of melamine, at a ratio of 1.2 – 3.5 moles, and preferably 1.8 – 3.0 moles, of the formaldehyde per mole of the benzoguanamine or said mixture, are reacted preferably at a temperature of 50° – 100°C. and a pH in the range of 5 – 10, using water as the reaction medium to prepare an aqueous liquid of a soluble and fusible resin whose degree of modified water tolerance is 0 – 150 %. The so obtained aqueous liquid is introduced to an aqueous solution of protective colloid with stirring to prepare an emulsion. After adding a curing catalyst to this emulsion and holding it for at least one hour at a temperature in the range of 40° – 60°C., it is heated at a temperature in the range of 60° – 200°C. at normal atmospheric or superatmospheric pressure to effect the hardening, whereupon is obtained a suspension of the intended finely divided hardened resin. A powder of the finely divided hardened resin can be obtained from this suspension by separating the hardened resin therefrom, followed by washing, drying and crushing of the aggregated product.

The expression "degree of modified water tolerance" ($x$), as used herein, is a measure which indicates the affinity for water of the foregoing soluble and fusible resin and can be determined in the following manner. In a test which comprises adding dropwise water to a solution in 5 grams of methanol of 2 grams of an aqueous reaction product of formaldehyde and either benzoguanamine or a mixture of benzoguanamine and melamine, while holding the temperature of the solution at 25°C., the amount of water (W grams) required for causing the solution to become turbid is measured, and the degree of modified water tolerance ($x$) is then calculated as follows:

Degree of modified water tolerance $$x = \frac{W}{2} \times 100 \, (\%)$$

The foregoing aqueous liquid of a soluble and fusible resin is one in which the resin which has been rendered hydrophobic is present in a state close to that of a water-in-oil emulsion. A soluble and fusible resin of this kind is soluble in such organic solvents as acetone, dioxane and methanol but is substantially insoluble in water. Further, this soluble and fusible resin possesses a strong affinity for dyestuffs and can be readily dyed, using any of the dyes regardless of whether the dye is one which is water-soluble or oil-soluble. For instance, this resin can be dyed with various dyestuffs, including such as the water-soluble monoazo dyes, water-soluble polyazo dyes, metal-containing azo dyes, disperse azo dyes, anthraquinone acid dyes, anthraquinone vat dyes, alizarine dyes, disperse anthraquinone dyes, indigo dyes, sulfide dyes, phthalocyanine dyes, diphenylmethane dyes, triphenylmethane dyes, nitro dyes, nitroso dyes, thiazole dyes, xanthene dyes, acridine dyes, azine dyes, oxazine dyes, thiazine dyes, benzoquinone dyes, naphthoquinone dyes and cyanine dyes.

In preparing the aforementioned soluble and fusible resin, the formaldehyde to be used may be any that produces formaldehyde, such as formalin, trioxane and paraformaldehyde. And of these, formalin is especially used with effectiveness. Again, the melamine must be used in an amount within the above-indicated range. When the amount used of the melamine exceeds the foregoing range, the affinity of the resulting resin for dyestuffs, and especially the oil-soluble dyestuffs, is greatly reduced. Further, the condensation reaction proceeds rapidly to make it impossible to obtain a soluble and fusible resin. Hence, the use of the melamine in excess is undesirable. Again, as regards the range of the pH, when the pH is less than 5 or exceeds 10, difficulty is experienced in controlling the reaction since the reaction speed is too fast. Further, as regards the degree of modified water tolerance, this also must be within the range specified. A degree of modified water tolerance in excess of 150 % is not suitable, because the affinity for water is too great, with the consequence that when the resin is to be emulsified by introduction into the aqueous solution of protective colloid with stirring, the resin is plasticized and softened by means of water to cause coagulation being set up between the individual emulsified particles. On the other hand, a degree of modified water tolerance of less than 0, i.e., a resin that does not dissolve at all in methanol, is also unsuitable, since in this case solubility of dyestuffs in the resin is poor and hence only the surface of the resin is dyed. In addition, the viscosity of the resinous liquid itself is too high to cause difficulty in carrying out the emulsification operation.

The dyeing of the soluble and fusible resin with dyestuffs can be readily carried out by various methods. For instance, by introducing an aqueous liquid of the soluble and fusible resin and the desired dye concurrently but separately to an aqueous solution of protective colloid with stirring, it is possible to not only obtain an emulsion of said resin but dye the resin as well. Again, it is also possible to obtain an emulsion of the soluble and fusible resin as well as to dye the resin at the same time, say, by a procedure consisting of introducing with stirring an aqueous liquid of the soluble and fusible resin to either an aqueous solution containing a protective colloid and a water-soluble dye or an aqueous liquid containing a protective colloid and an oil-soluble dye. Further, it is also possible to dye the soluble and fusible resin, say, by adding either a water-soluble or an oil-soluble dye to the emulsion of said resin followed by thorough stirring. In the case where the dyeing is carried out by using an oil-soluble dye, good results are obtained by a procedure of introducing the soluble and fusible resin to an aqueous liquid containing a protective colloid and an oil-soluble dye. In the case where the dyeing is carried out by a procedure consisting of adding the dye to the emulsion of the soluble and fusible resin in that substantially all of the dye migrates to said resin to achieve perfect dyeing of the resin. That a water-soluble dye or an oil-soluble dye preferentially migrates in this manner to the resin dispersed in the emulsion to provide good results is truly surprising. Thus, according to this method, it becomes possible to keep the emulsion of the soluble and fusible resin in storage and carrying out the dyeing of the resin by adding a dye, as required. The emulsion of the soluble and fusible resin of this invention is obtained by introducing an aqueous liquid of the soluble and fusible resin, such as hereinbefore described, to an aqueous solution of protective colloid held in a state of agitation, using an agitator that can provide a strong shearing force to the liquid, such, for example, as a colloid mill or a high speed agitator, followed by thorough stirring. It is a stable oil-in-water emulsion containing dispersed therein a resin of uniform particle size. A satisfactory emulsion cannot be obtained in this case by the introduction of the aqueous solution of protective colloid to the aqueous liquid of the soluble and fusible resin of relatively high temperature, the condition in which this liquid is during its preparation or immediately subsequent to its preparation. While the reason therefor is not entirely clear, it is believed that the protective colloid loses its activity due to its becoming dissolved in the resin.

As the protective colloid to be used, mention can be made of such as polyvinyl alcohol, carboxymethyl cellulose, sodium alginate, polyacrylic acid and water-soluble polyacrylates, of which conveniently used is polyvinyl alcohol in view of the stability of the emulsion obtained. Good results are obtained regardless of whether the polyvinyl alcohol is one which is completely or partially saponified or regardless of its degree of polymerization. The protective colloid is used in an amount of 0.5 – 30 parts by weight, and preferably 1 – 5 parts by weight, per 100 parts by weight of the soluble and fusible resin. There is a tendency to the particle size of the resulting fine particles becoming smaller as the amount used of the protective colloid is increased.

The protective colloid is used as an aqueous solution by dissolving it in water in advance of its use. Further, if necessary, it is possible to use a part of the total amount of the protection colloid to be used by dissolving a part of it in advance in water and using it as an aqueous solution and then using the rest by adding it along with an aqueous liquid of the soluble and fusible resin.

In the present invention the step of introducing the aqueous liquid of the soluble and fusible resin into the aqueous solution of protective colloid with stirring to render said resin into a stable emulsion is indispensable, and the feature of the present invention resides in submitting this stable emulsified resin to various treatments. It is in this point that the present invention differs fundamentally from the conventional processes which use the melamine or urea resin. For instance, in accordance with the present invention, the soluble and fusible resin stably emulsified in an aqueous liquid can be readily dyed with the dyestuffs. Again, even in the case of the oil soluble dyestuffs which are insoluble in water, the dyeing with these dyes can be readily accomplished when they are first dispersed in water and then added to the emulsion with stirring. Further, according to this invention, the dyeing of the soluble and fusible resin can be carried out by introducing an aqueous liquid of said resin into an aqueous solution of protective colloid in which either a water-soluble dye has been dissolved or an oil-soluble dye has been dispersed and suspended. A further surprising fact is that, in this invention, even in the case where such insoluble azo pigments as Benzidine Yellow, Hansa Yellow and Toluidine Red or the lake type pigments such as Lake Red C and Carmine 6B have been used, these pigments dissolve in the soluble and fusible resin to form colored, stable emulsions of the aforesaid resin. Needless to say, it is possible to dye the soluble and fusible resin before it is emulsified by adding the dye or pigment to the resin before its emulsification.

In contrast, when finely divided hardened resins are to be produced from, say, a melamine-formaldehyde resin in accordance with the conventional process, gelling inevitably arises when the reaction is carried out until the resin in the water-soluble stage is rendered hydrophobic as in the present invention, with the consequence that it becomes substantially difficult to effect the emulsification even though a protective colloid is used. Hence, it becomes necessary to carry the hardening reaction straightway from the water-soluble resin stage to the insoluble, infusible stage by the action of the catalyst. Thus, in accordance with the conventional process, it is not possible, as in the present invention, to go through the emulsion state of the soluble and fusible resin and, in consequence, as hereinbefore noted, a number of serious shortcomings are brought about. Again, in the case of a water-soluble resin predominantly of either melamine or urea, since the hardening reaction is completed within a very short time to immediately form an insoluble and infusible resin, its treatment can only be performed during the water-soluble stage of the resin. Hence, for instance, if this resin is to be dyed, the dyestuffs that can be used will be limited to the water-soluble dyes, and thus a variegated application of this finely divided hardened resin cannot be expected.

The soluble and fusible resin in an emulsified state can be converted to a finely divided hardened resin by adding a curing catalyst to the resinous emulsion followed by holding the emulsion in the presence of the catalyst at a temperature in the range of 40° – 60°C. for a period of at least one hour and preferably 2 – 10 hours, and thereafter effecting the hardening by raising the temperature to that in the range of 60° – 200°C., and preferably 60° – 160°C. This finely divided hardened resin is obtained in the form of an aqueous suspension. When in this case the hardening of the resin is carried out without performing this pretreatment or by raising the temperature to above 60°C. in a short time of less than one hour, partial or total aggregation of the soluble and fusible resin is set up to result in the formation of large particles or lumps in addition to the finely divided particles. Again, no proportionate enhancement in effects can be expected even though the resin is held for periods longer than 10 hours at the foregoing temperatures. Further, while a higher temperature is desirable for carrying out the hardening adequately, a temperature in excess of 200°C. is objectionable, since the resin is degraded to result in a decline in the properties of the hardened resin. When the hardening is carried out at a temperature in the range of 100° – 200°C., the hardening is carried out under superatmospheric pressure. On the other hand, when the hardening is carried out at a relatively low temperature of the order ranging 60° – 80°C., for completing the curing reaction a procedure consisting of drying the hardened resin after its separation from the suspension and thereafter heating the resin at a temperature in the range of 100° – 200°C. is also effective.

As the curing catalyst, usable are the mineral acids such as hydrochloric, sulfuric and phosphoric acids, the ammonium salts of these mineral acids, the sulfonic acids such as benzenesulfonic, toluenesulfonic and dodecylbenzenesulfonic acids, the organic acids such as phthalic and benzoic acids, and sulfamic acid. These curing catalysts are effectively used in an amount in the range of 0.01 – 8 parts per 100 parts of the soluble and fusible resin.

By adding to a suspension of a finely divided hardened resin obtained as hereinabove described a strong acid such as a mineral acid or a sulfonic acid in a suitable amount, if necessary, to aggregate the particles of said resin, followed by separation by filtration, water-washing and drying the aggregates of the resin either under reduced pressure or atmospheric pressure with or without heating at a temperature ranging from room temperature to about 200°C. and thereafter crushing the aggregates that have been formed by means of a secondary aggregative force, with a very slight force, say, a slight force of the order of that of lightly pressing the aggregates with the fingers, the finely divided hardened resin powder of the present invention can be obtained. As the method of heating to be used in this case, any of the heating methods including that of transferring the heat by means of conduction, radiation or convection, or a combination of these methods can be employed. However, preferred is the method of heat transfer using hot air in view of the excellence of the drying speed and uniformity of drying. By submitting the finely divided hardened resin, after its drying, to a heat treatment at a temperature in the range of 100° – 200°C., the thermal resistance, water resistance and resistance to chemicals of the intended resin can be enhanced. Hence, the resin is preferably submitted to such a heat treatment, as required. However, when the drying is carried out at a relatively high temperature, the drying and the heat treatment are concurrently performed. Hence, in such a case an additional heat treatment is not required. Needless to say, the finely divided hardened resin powder of the present invention demonstrates excellent properties regardless of whether or not a heat treatment is given.

A specific process for producing the finely divided hardened resins of this invention is carried out in the following manner. As one mode, either benzoguanamine or a mixture of benzoguanamine and melamine is added to formalin, the pH is adjusted to come within the range of 5 – 10, and thereafter the reaction is carried out at a temperature ranging between 50° and 100°C. From the stage that the whole of the reaction system becomes a homogeneous solution, the reaction proceeds to result in the reaction system becoming turbid. When an aqueous resinous liquid whose degree of modified water tolerance ranges from 0 to 150 % is formed, this aqueous liquid is introduced with stirring to an aqueous solution containing a protective colloid in an amount in the range of 1 – 30 parts by weight based on the resin, thus obtaining an emulsion of a soluble and fusible resin. To this emulsion is then added, a curing catalyst in an amount of 0.01 – 8 parts by weight per 100 parts by weight of the resin, following which the emulsion is held for at least one hour at a temperature of 40° – 60°C., and thereafter the hardening of the resin is carried out by raising the temperature to that ranging between 60° and 200°C. under normal atmospheric or superatmospheric pressure. Thus is obtained a suspension of a finely divided hardened resin. A suitable acid is added to this suspension to form aggregates of the resin by aggregation of the dispersed resin, if necessary. Then the aggregates of hardened resin are obtained by filtration, water-washed and thoroughly dried to remove the water. If necessary, the dried aggregates are than submitted to a heat treatment for 0.5 – 10 hours at a temperature in the range of 100° – 200°C. Now, by crushing the aggregates by application of a slight force, a finely divided hardened resins can be obtained.

Various modifications of the foregoing invention process, without deviating from the scope thereof, can be mentioned. For instance, the aqueous liquid of the soluble and fusible resin and either a water-soluble or an oil-soluble dyestuff in an amount of 0.01 – 30 parts by weight per 100 parts by weight of the resin are concurrently but separately introduced with stirring to an aqueous solution of protective colloid to obtain an emulsion of the soluble and fusible resin. This is followed by the addition of a curing catalyst and thereafter holding this emulsion for at least 1 hour at a temperature in the range of 40° – 60°C., followed by hardening the resin by raising the temperature to that in the range of 60° – 200°C. By operating thus, a suspension of a dyed, finely divided hardened resin can be obtained. Again, a suspension of a dyed, finely divided hardened resin can also be prepared by a procedure consisting of introducing the aqueous liquid of the soluble and fusible resin with stirring to either an aqueous solution containing a protective colloid and a water-soluble dyestuff or an aqueous liquid containing a protective colloid and an oil-soluble dyestuff to obtain an emulsion of the soluble and fusible resin, followed by adding a curing catalyst and holding the emulsion for at least 1 hour at a temperature in the range of 40° – 60°C., and thereafter hardening the resin by raising the temperature to that in the range of 60° – 200°C. under normal atmospheric or superatmospheric pressure. As another procedure, a suspension of a dyed, finely divided hardened resin can also be prepared by adding either a water-soluble or an oil-soluble dyestuff and a curing catalyst to the emulsion of the soluble and fusible resin, followed by holding the emulsion for at least one hour at a temperature in the range of 40° – 60°C. and thereafter hardening the resin by raising the temperature to that in the range of 60° – 200°C. under normal atmospheric or superatmospheric pressure. By adding to the suspension of a dyed, finely divided hardened resin obtained by these methods a suitable acid, if necessary, to aggregate the dispersed resin into aggregates, followed by obtaining the aggregates by filtration, water-washing, removing the water by thorough drying and, if necessary, heat treating the dried aggregates for 0.5 – 10 hours at a temperature of 100° – 200°C., and thereafter crushing the aggregates, a dyed, finely divided hardened resin can be obtained.

The finely divided hardened resin of the present invention obtained as hereinbefore described, being a spheroidal hardened resin of particle size of the order ranging from 0.1 – 10 microns, retains with no impairment at all the various excellent properties that are essentially possessed by the benzoguanamine type resins, such, for example, as superior thermal resistance, water resistance, resistance to solvents and resistance to attack by chemicals as well as an excellent affinity for the various other resins. Hence, the finely divided hardened resin of this invention can be used for various purposes. For instance, the undyed, finely divided hardened resin can be effectively used as obtained along with a fluorescent brightener as a white, lightweight filler of the various thermoplastic or thermosetting resins or rubber. Further, it can be effectively used as a white pigment in such fields as the thermoplastic resin, thermosetting resin, rubber, paint, printing ink, textile printing and coated paper fields. On the other hand, the dyed, finely divided hardened resin can be effectively used as a pigment in such fields as the plastics, rubber, paint, printing ink, textile printing and coated paper fields. This resin is suitable for use in the case of especially the coloration of those thermoplastic resins which involve heating at elevated temperatures of 200° – 300°C. during their molding, since the this resin excels in thermal resistance and resistance to bleeding.

The finely divided hardened resin obtained in accordance with the invention process by hardening of the emulsion of the soluble and fusible resin after addition thereto of an ultraviolet absorbent is readily managed as a master batch of an ultraviolet absorbent and can be effectively used in such fields as the plastics, rubber, paint and printing ink fields.

The following examples will be given for more fully illustrating the invention. Unless otherwise noted, the parts in the example are on a weight basis.

EXAMPLE 1

A 4-necked flask equipped with a stirrer, a reflux condenser and a thermometer was charged with 150 parts of benzoguanamine, 130 parts of formalin (formaldehyde content 37 %) and 0.52 part of a 10 % aqueous solution of sodium carbonate. The pH of the mixture was 8.0. While agitating this mixture, its temperature was raised to 95°C., and its reaction was carried out for 5 hours to obtain an aqueous liquid of a soluble and fusible resin having a degree of modified water tolerance of 60 %.

Separately, an aqueous protective colloid solution was prepared by dissolving in 750 parts of water 8 parts of Kuraray Poval 205 [a partially (87 – 89 mol %) saponified product of polyvinyl acetate (degree of polymerization 500) produced by Kuraray Co., Ltd., Japan]. After raising the temperature of this aqueous solution to 90°C., it was stirred at 7,000 rpm with a high speed agitator (Homomixer, Model HV-M manufactured by Tokushu Kikako Co., Ltd., Japan). While this aqueous solution of protective colloid was being stirred, the foregoing aqueous liquid of a soluble and fusible resin having a degree of modified water tolerance of 60 % was introduced to the aqueous solution of protective colloid to obtain a white emulsion. After cooling the so obtained emulsion to 40°C., 2 parts of dodecylbenzenesulfonic acid was added, after which the emulsion was held for 2 hours at a temperature of 40°C. while it was being gently stirred with a horseshoe type agitator, followed by stirring the emulsion for 2 hours each at the several temperatures of 50°, 60° and 90°C. thereby hardening the resin and obtaining a suspension of a finely divided hardened resin.

The finely divided hardened resin was then separated from the suspension by filtration and water-washed, following which the filter cake was heated for 5 hours at 150°C. to obtain 178 parts of aggregate of a finely divided hardened resin. When these aggregates were crushed by the application of a weak force of the order of that of pressing lightly with the fingers, a white, finely divided hardened resin was obtained.

When the so obtained finely divided hardened resin was examined with a scanning type electron microscope, the particles were found to be spheroidal and of an average particle size of 0.8 micron in diameter. Further, the compatibility of this finely divided hardened resin with the various organic solvents such as methanol, ethanol, isopropyl alcohol, butanol, ethyl acetate, butyl acetate, methyl cellosolve, ethyl cellosolve, acetone, methyl ethyl ketone, toluene and xylene was extremely good. Moreover, this finely divided hardened resin was not swelled or dissolved at all by these organic solvents. In addition, even though this finely divided harded resin was heated at a temperature in excess of 250°C., such phenomena as fusion or melting were not noted.

Further, for confirming that the resin having a degree of modified water tolerance of 60 % obtained in this example is a soluble and fusible resin, the following experiment was conducted.

Three parts of paratoluenesulfonic acid was added to 1000 parts of the foregoing emulsion, following which a cotton linter paper of 6 mils was impregnated with the emulsion. The impregnated paper was then dried for 8 hours in 100 C. hot air to obtain an impregnated paper whose resinous content was 52% and volatile content was 5.3 %. Eight sheets of the impregnated paper were piled one on top of the other and hot pressed for 10 minutes under the conditions of a pressure of 30 kg/cm² and a temperature of 150°C. to obtain a 1.5-mm-thick laminated sheet. This laminated sheet was then measured for its resistance in accordance with the procedure described in the JIS K-6911, with the results shown below.

| Normal state | $3.8 \times 10^{11} \Omega$ |

| After boiling for 2 hours | 5.5 × 10⁹ Ω |

CONTROL 1

To a four-necked flask of the same kind as that used in Example 1 were charged 150 parts of benzoguanamine, 130 parts of formalin (formaldehyde content 37%) and 0.52 part of a 10 % aqueous solution of sodium carbonate. The pH of the mixture was 8.0. While stirring this mixture, it was reacted for 3 hours at a temperature of 95°C. to obtain an aqueous liquid of a resin having a degree of modified water tolerance of 200 %. When this resin was used and an emulsion was prepared by following the procedure described in Example 1, lumps were formed in a part of the emulsion even while it was being stirred, and while the emulsion was being cooled to 40°C., a major portion of the emulsion was coagulated in the meanwhile.

CONTROL 2

When to an emulsion of a soluble and fusible resin prepared by operating as in Example 1 was added dodecylbenzenesulfonic acid in like manner followed by heating the emulsion for 2 hours at a temperature of 70°C., the particles became large and in part of the emulsion were formed aggregates which adhered to the wall of the vessel.

EXAMPLE 2

A 4-necked flask of the same kind as that used in Example 1 was charged with 120 parts of benzoguanamine, 30 parts of melamine, 162 parts of formalin (formaldehyde content 37 %) and 0.65 part of a 10 % aqueous solution of sodium carbonate. The pH of the mixture was 8.0. While stirring this mixture, its temperature was raised to 95°C. and its reaction was carried out for 4.5 hours to obtain an aqueous liquid of a soluble and fusible resin having a degree of modified water tolerance of 95 %.

Separately, an aqueous solution of protective colloid was prepared by dissolving in 600 parts of water 8.5 parts of Kuraray Poval 117 [a completely saponified product of polyvinyl acetate (degree of polymerization 1700) produced by Kuraray Company]. After raising the temperature of this aqueous solution to 80°C., it was stirred at about 5000 rpm with Homomixer. To this aqueous solution of protective colloid was then introduced the foregoing aqueous liquid of a soluble and fusible resin having a degree of modified water tolerance of 95 % to obtain a white emulsion. After cooling this emulsion to 40°C. and adding 3 parts of paratoluenesulfonic acid thereto, it was held for 1.5 hours at 50°C. while gently being stirred with a horseshoe type agitator, followed by holding the emulsion for 2 hours each at the several temperatures of 60°, 70° and 90°C. to effect the hardening of the resin thereby obtaining a suspension of a finely divided hardened resin.

The finely divided hardened resin was separated from the suspension by filtration and water-washed, after which the filter cake was dried for 2 hours with 80°C. hot air. This was followed by heating the resin for 3 hours at a temperature of 140°C. to obtain 193 parts of aggregates of a finely divided hardened resin. The aggregates were crushed by the application of a weak force of the order of that of lightly pressing with the fingers to obtain a white resin powder.

When this powder was examined with a scanning type electron microscope, it was found that the particles were spheroidal and of an average particle size of 0.65 micron in diameter. Further, the compatibility of this powder with the various organic solvents such as methanol, ethanol, isopropyl alcohol, butanol, ethyl acetate, butyl acetate, methyl cellosolve, ethyl cellosolve, acetone, methyl ethyl ketone, toluene or xylene was extremely good. Moreover, this powder was not swelled or dissolved at all by these organic solvents. In addition, even though this powder was heated at a temperature in excess of 250°C., such phenomena as fusion or melting were not noted.

EXAMPLE 3

To 100 parts of the emulsion of a soluble and fusible resin obtained as in Example 1 was added 0.04 part of a fluorescent brightening agent (Kayaphor C conc., Color Index = Fluorescent Brightening Agent 168, produced by Nippon Kayaku Co., Ltd., Japan), after which the experiment was operated as in Example 1 to obtain a white resin powder.

On examination of the so obtained product with a scanning type electron microscope, it was found to be a powder having an average particle size of 0.8 micron in diameter.

EXAMPLE 4

An emulsion of a soluble and fusible resin obtained as in Example 2 was dyed by adding to 900 parts thereof 2 parts of Rhodamine B (Color Index = 45170) and 2 parts of Rhodamine 6GCP (Color Index = 45160), after which the subsequent operations were carried out as in Example 2 to obtain 194 parts of a resin powder having a pink daylight fluorescent color.

The average particle size of this resin powder was 0.65 in diameter.

EXAMPLE 5

To 280 parts of an emulsion and fusible resin obtained as in Example 1 was added one part of 2-(2'-hydroxy-5'-methyl-phenyl)benzotriazole as an ultraviolet absorbent and, after its dissolution in the emulsion, the experiment was carried out as in Example 1 to obtain 178.5 parts of a white, finely divided hardened resin containing an ultraviolet absorbent.

EXAMPLE 6

A 4-necked flask such as used in Example 1 was charged with 150 parts of benzoguanamine, 162 parts of formalin (formaldehyde content 37 %) and 6.4 parts of a 10 % aqueous solution of sodium carbonate. The pH of the mixture was 8.0. While stirring this mixture, its temperature was raised to 92°C. and its reaction was carried out for 4 hours to obtain an aqueous liquid of a soluble and fusible resin having a degree of modified water tolerance of 78 %.

Separately, 10 parts of Gohsenol NL05 [a completely (98.5 – 100 mol %) saponified product of polyvinyl acetate, degree of polymerization below 1000, produced by Nippon Synthetic Chemical Co., Ltd., Japan] was dissolved in 800 parts of water, followed by the addition of 30 parts of Styrene Yellow G (an oil-soluble dye produced by Badische Anilin- & Soda-Fabrik Aktiengesellschaft) and thereafter stirring and dispersing the dye with Homomixer. To this dispersion was then introduced with stirring the foregoing aqueous liquid of a soluble and fusible resin having a degree of modified water tolerance of 78 % to obtain a yellow emulsion by stirring at 8000 rpm with Homomixer. After cooling this emulsion to 40°C., 4 parts of dodecylbenzenesulfonic acid was added, followed by heating the emulsion for 2 hours each at the several temperatures of 40°, 50°, 60°, 70° and 90°C. while stirring the emulsion with a horseshoe type agitator, thus obtaining a suspension of a finely divided hardened resin.

The finely divided hardened resin was then separated by filtration and water-washed, after which the filter cake was dried for 1 hour with 90°C. hot air and then heated for 4 hours at a temperature of 150°C. to obtain 203 parts of aggregates of a finely divided hardened resin. When these aggregates were crushed by the application of a weak force of the order of that of lightly pressing with the fingers, a yellow resin powder was obtained.

When this yellow powder was examined with a scanning type electron microscope, it was found to be composed of spheroidal particles having an average particle diameter of 0.92 micron.

This yellow powder was added to polypropylene (produced by Sumitomo Chemical Co., Ltd., Japan) at the rate of 0.2 part of the former per 100 parts of the latter to impart coloring by the dry coloring technique, after which the colored polypropylene was injection molded with an injection machine under the conditions of cylinder temperatures of respectively 250° and 300°C. to obtain 3-mm-thick test specimens each having the dimensions of 43 × 77 mm. On comparison of the color of these specimens, no difference could be noted. That is to say, a change in the color due to the temperature of the cylinder could not be discerned.

The specimens and a white sheet of soft polyvinyl chloride were placed one on top of the other and left to stand for 3 days at a temperature of 30°C. with a 500-gram load placed atop the superposed sheets, after which the soft polyvinyl chloride sheet was examined. No transfer of color was noted. Further, the specimens were exposed for 400 hours to a fade-o-meter, but no fading was noted.

Again, by way of comparison, test specimens prepared in similar manner by injection molding, except that chrome yellow was used instead of the yellow, finely divided hardened resin, were compared with the test specimens obtained in accordance with the present invention. This comparison showed that the yellow, finely divided hardened resin was superior to chrome yellow pigment in tinting strength.

EXAMPLE 7

Example 6 was repeated, except that, instead of the Styrene Yellow G, Aizen Spilon Yellow GRH (a product of Hodogaya Chemical Co., Ltd., Japan, Color Index=Solvent Yellow 61) was used to obtain a yellow, finely divided hardened resin.

EXAMPLE 8

A paste obtained by mixing 20 parts of Sumiplast HL2R (an oil-soluble dye produced by Sumitomo Chemical Co., Ltd., Japan), one part of Emulgen 930 (Polyoxyethylene nonyl phenol ether, a nonionic surfactant produced by Kao Atlas Co., Ltd., Japan) and 50 parts of water was mixed with an emulsion of a soluble and fusible resin obtained as in Example 1, following which the mixture was stirred for 1 hour at 50°C. to effect the solution of the oil-soluble dye in the resin side by its migration thereto. The subsequent operations were carried out as in Example 1 to obtain a yellow powder.

Test specimens were prepared with this yellow powder following the procedure described in Example 6. When the bleeding test with the white polyvinyl chloride sheet was carried out on these specimens, there was no bleeding at all.

EXAMPLE 9

A 4-necked flask such as used in Example 1 was charged with 150 parts of benzoguanamine, 162 parts of formalin (formaldehyde content 37 %) and 0.65 part of a 10 % aqueous solution of sodium carbonate. The pH of the mixture was 8.0. While stirring this mixture, it was reacted for 5 hours at 93°C. to obtain an aqueous liquid of a soluble and fusible resin having a degree of modified water tolerance of 50 %.

Separately, 30 parts of Styrene Yellow G and 4 parts of Kuraray Poval 205 were added to 176 parts of water to obtain a dye suspension.

Further, there also was prepared separately an aqueous solution of protective colloid by preparing a solution in 700 parts of water of Kuraray Poval 205, followed by raising the temperature of this aqueous solution to 80°C. and stirring same at 7000 rpm with Homomixer.

The aforesaid aqueous liquid of a soluble and fusible resin having a degree of modified water tolerance of 50 % and the dye suspension were then introduced concurrently but separately to the foregoing aqueous solution of protective colloid with stirring to obtain a colored emulsion. After cooling this emulsion to 40°C. and adding 6 parts of dodecylbenzenesulfonic acid thereto, it was heated for 2 hours each at the several temperatures of 40°, 50° and 70°C. while being gently stirred to obtain a suspension of a finely divided hardened resin.

The finely divided hardened resin was separated by filtration and water-washed, after which the filter cake was dried for 4 hours with 80°C. hot air and then heated for 4 hours at 150°C. to obtain 212 parts of aggregates of a yellow, finely divided hardened resin. These aggregates were readily crushed by a slight pressure to provide powder.

When this powder was examined with a scanning type electron microscope, it was found to be composed of spheroidal particles whose average diameter was 0.85 micron.

EXAMPLE 10

By operating as in Example 9 an aqueous liquid of a soluble and fusible resin having a degree of modified water tolerance of 50 % was prepared.

Separately, an aqueous solution was prepared by dissolving 6.8 parts of Kuraray Poval 205 in 610 parts of water, after which the temperature of this aqueous solution was raised to 80°C. followed by stirring it at 7,000 rpm with Homomixer to prepare an aqueous solution of protective colloid. The foregoing soluble and fusible resin having a degree of modified water tolerance of 50 % was then introduced to this aqueous solution of protective colloid with stirring to obtain a white emulsion.

After cooling the emulsion to 30°C., 16.8 parts of Aminyl Yellow E-GNL (an acid dye produced by Sumitomo Chemical Co., Ltd., Color Index = Acid Yellow 19) was added and disssolved therein, following which dissolved parts of 1 normal hydrochloric acid and 9 parts of paratoluenesulfonic acid were added. The emulsion was then heated for 2 hours each at the several temperatures of 40°, 50°, 70° and 90°C. while being gently stirred to effect the hardening of the resin, thus obtaining a suspension of a finely divided hardened resin.

The finely divided hardened resin was separated by filtration and water-washed, after which the filter cake was dried for 3 hours with 80°C. hot air and thereafter heated for 3 hours at 150°C. to obtain 191 parts of aggregates of a yellow, finely divided hardened resin. These aggregates were readily crushed by a slight pressure to provide a yellow powder.

When this powder was examined with a scanning type electron microscope, it was found to be composed of spheroidal particles having an average diameter of 0.65 micron.

EXAMPLE 11

A 4-necked flask such as used in Example 1 was charged with 150 parts of benzoguanamine, 130 parts of formalin (formaldehyde content 37 %) and 0.52 part of a 10 % aqueous solution of sodium carbonate, and a mixture having a pH of 8.0 was obtained. While stirring this mixture, its temperature was raised to 95°C., and its reaction was carried out for 4 hours to obtain a soluble and fusible resin having a degree of modified water tolerance of 60 %.

Separately, 4 parts of Kuraray Poval 205 was dissolved in 690 parts of water, after which the temperature of this aqueous solution was raised to 90°C. This aqueous solution was then stirred at 7000 rpm with Homomixer. This was followed by introducing the foregoing soluble and fusible resin having a degree of modified water tolerance of 60 % to the aqueous Kuraray Poval 205 solution with stirring to obtain a white emulsion. This emulsion was cooled to 35°C. Next, a homogeneous dispersion of 10 parts of Dianix Fast Brilliant Yellow 5GM/D (a product of Mitsubishi Chemical Co., Ltd., Japan, Color Index = Disperse Yellow 71) in 120 parts of water was introduced to the white emulsion, followed by the addition of 20 parts of 1 normal hydrochloric acid with stirring. The temperature of the emulsion was then raised to 40°C. while gently stirring same with a horseshoe type agitator, at which temperature the emulsion was then held for 2 hours. This was followed by maintaining the temperature of the emulsion for 2 hours each at both the temperatures of 50° and 70°C. followed by raising the temperature to 90°C., at which latter temperature the emulsion was held for 3 hours to obtain a suspension of a finely divided hardened resin.

The colored finely divided hardened resin was separated from the so obtained suspension by filtration and water-washed, after which the filter cake was dried for 2 hours at 80°C. followed by heating for 4.5 hours at a temperature of 150°C. to obtain 191 parts of aggregates of a yellow, finely divided hardened resin. It was possible to crush these aggregates with a weak force of the order of that of lightly pressing with the fingers to obtain a yellow powder.

When this powder was examined with a scanning type electron microscope, it was found to be composed of spheroidal particles of an average diameter of 0.65 micron.

EXAMPLE 12

Except that, as the dye, Sumikaron Red 3G (a product of Sumitomo Chemical Co., Ltd., Color Index = Disperse Red 43) was used instead of Dianix Fast Brilliant Yellow 5GM/D, the experiment was otherwise carried out as in Example 11 to obtain a red, finely divided hardened resin.

What is claimed is:

1. A process for preparing a suspension of a finely divided hardened resin which comprises, in combination, the steps of reacting in an aqueous medium at pH of 5 – 10 a member selected from the group consisting of benzoguanamine and a mixture of 100 – 50 % by weight of benzoguanamine and 0 – 50 % by weight of melamine with formaldehyde in a ratio of 1 mole of the former to 1.2 – 3.5 moles of the latter to prepare an aqueous liquid of a soluble and fusible resin having a degree of modified water tolerance of 0 – 150 %, introducing said aqueous liquid to an aqueous solution of protective colloid with stirring to prepare an emulsion of a soluble and fusible resin, adding a curing catalyst to said emulsion, followed by holding same for at least 1 hour at a temperature in the range of 40° – 60°C., and thereafter heating the emulsion at a temperature in the range of 60° – 200°C. under normal atmospheric or superatmospheric pressure to effect the hardening of the resin.

2. A process for preparing a suspension of a dyed, finely divided hardened resin which comprises, in combination, the steps of reacting in an aqueous medium at a pH of 5 – 10 a member selected from the group consisting of benzoguanamine and a mixture of 100 – 50 % by weight of benzoguanamine and 0 – 50 % by weight of melamine with formaldehyde in a ratio of 1 mole of the former to 1.2 – 3.5 moles of the latter to prepare an aqueous liquid of a soluble and fusible resin having a degree of modified water tolerance of 0 – 150%, introducing said aqueous liquid and a dyestuff selected from the group consisting of water-soluble or oil-soluble dyes concurrently but separately to an aqueous solution of protective colloid with stirring to prepare an emulsion of a dyed soluble and fusible resin, adding a curing catalyst to said emulsion, followed by holding same for at least 1 hour at a temperature in the range of 40° – 60°C., and thereafter heating the emulsion at a temperature in the range of 60° – 200°C. under normal atmospheric or superatmospheric pressure to effect the hardening of the resin.

3. A process for preparing a suspension of a dyed, finely divided hardened resin which comprises, in combination, the steps of reacting in an aqueous medium at a pH of 5 – 10 a member selected from the group consisting of benzoguanamine and a mixture of 100 – 50 % by weight of benzoguanamine and 0 – 50 % by weight of melamine with formaldehyde in a ratio of 1 mole of the former to 1.2 – 3.5 moles of the latter to prepare an aqueous liquid of a soluble and fusible resin having a degree of modified water tolerance of 0 – 150 %, introducing said aqueous liquid with stirring to an aqueous solution selected from the group consisting of an aqueous solution containing a protective colloid and a water-soluble dye and an aqueous solution containing a protective colloid and an oil-soluble dye to prepare an emulsion of a dyed soluble and fusible resin, adding a curing catalyst to said emulsion, followed by holding same for at least one hour at a temperature in the range of 40° – 60° C., and thereafter heating the emulsion at a temperature in the range of 60° – 200°C. under normal atmospheric or superatmospheric pressure to effect the hardening of the resin.

4. A process for preparing a suspension of a dyed finely divided hardened resin which comprises, in combination, the steps of reacting in an aqueous medium at a pH of 5 – 10 a member selected from the group consisting of benzoguanamine and a mixture of 100 – 50 % by weight of benzoguanamine and 0 – 50 % by weight of melamine with formaldehyde in a ratio of 1 mole of the former to 1.2 – 3.5 moles of the latter to prepare an aqueous liquid of a soluble and fusible resin having a degree of modified water tolerance of 0 – 150%, introducing said aqueous liquid to an aqueous solution of protective colloid with stirring to prepare an emulsion of a soluble and fusible resin, adding a dyestuff selected from the group consisting of water-soluble or oil-soluble dyes to said emulsion, and adding a curing catalyst, followed by holding same for at least one hour at a temperature in the range of 40° – 60°C., and thereafter heating the emulsion at a temperature in the range of 60° – 200°C. under normal atmospheric or superatmospheric pressure to effect the hardening of the resin.

5. A process for producing a finely divided hardened resin powder which comprises, in combination, the steps of reacting in an aqueous medium at a pH of 5 – 10 a member selected from the group consisting of benzoguanamine and a mixture of 100 – 50% by weight of benzoguanamine and 0 – 50 % by weight of melamine with formaldehyde in a ratio of 1 mole of the former to 1.2 – 3.5 moles of the latter to prepare an aqueous liquid of a soluble and fusible resin having a degree of modified water tolerance of 0 – 150 %, introducing said aqueous liquid to an aqueous solution of protective colloid with stirring to prepare an emulsion of a soluble and fusible resin, adding a curing catalyst to said emulsion, followed by holding same for at least one hour at a temperature in the range of 40° – 60°C., then heating the emulsion at a temperature ranging between 60° and 200°C. to harden the resin thereby forming a suspension of a finely divided hardened resin, separating the hardened resin from the suspension, waterwashing and drying the resin, and thereafter crushing same into finely divided particles.

6. A process for producing a dyed, finely divided hardened resin powder which comprises, in combination, the steps of reacting in an aqueous medium at a pH of 5 – 10 a member selected from the group consisting of benzoguanamine and a mixture of 100 – 50 % by weight of benzoguanamine and 0 – 50 % by weight of melamine with formaldehyde in a ratio of 1 mole of the former to 1.2 – 3.5 moles of the latter to prepare an aqueous liquid of a soluble and fusible resin having a degree of modified water tolerance of 0 – 150 %, introducing said aqueous liquid and a dyestuff selected from the group consisting of water-soluble or oil-soluble dyes concurrently but separately to an aqueous solution of protective colloid with stirring to prepare an emulsion of a dyed soluble and fusible resin, adding a curing catalyst to said emulsion, followed by holding same for at least one hour at a temperature in the range of 40° – 60°C., then heating the emulsion at a temperature ranging between 60° and 200°C. to harden the resin thereby forming a suspension of a dyed, finely divided hardened resin, separating the hardened resin from the suspension, water-washing and drying the resin, and thereafter crushing same into finely divided particles.

7. A process for producing a dyed, finely divided hardened resin powder which comprises, in combination, the steps of reacting in an aqueous medium at a pH of 5 – 10 a member selected from the group consisting of benzoguanamine and a mixture of 100 – 50 % by weight of benzoguanamine and 0 – 50 % by weight of melamine with formaldehyde in a ratio of 1 mole of the former to 1.2 – 3.5 moles of the latter to prepare an aqueous liquid of a soluble and fusible resin having a degree of modified water tolerance of 0 – 150 %, introducing said aqueous liquid with stirring to an aqueous solution selected from the group consisting of an aqueous solution containing a protective colloid and a water-soluble dye and an aqueous solution containing a protective colloid and an oil-soluble dye to prepare an emulsion of a dyed soluble and fusible resin, adding a curing catalyst to said emulsion, followed by holding same for at least one hour at a temperature in the range of 40° – 60°C., then heating the emulsion at a temperature ranging between 60° and 200°C. to harden the resin thereby forming a suspension of a dyed finely divided hardened resin, separating the hardened resin from the suspension, water-washing and drying the resin, and thereafter crushing same into finely divided particles.

8. A process for producing a dyed, finely divided hardened resin powder which comprises, in combination, the steps of reacting in an aqueous medium at a pH of 5 – 10 a member selected from the group consisting of benzoguanamine and a mixture of 100 – 50 % by weight of benzoguanamine and 0 – 50% by weight of melamine with formaldehyde in a ratio of 1 mole of the former to 1.2 – 3.5 moles of the latter to prepare an aqueous liquid of a soluble and fusible resin having a degree of modified water tolerance of 0 – 150 %, introducing said aqueous liquid to an aqueous solution of protective colloid with stirring to prepare an emulsion of a soluble and fusible resin, adding a dyestuff selected from the group consisting of water-soluble or oil-soluble dyes to said emulsion, and adding a curing catalyst, followed by holding same for at least one hour at a temperature in the range of 40° – 60°C., then heating the emulsion at a temperature ranging between 60° and 200°C. to harden the resin thereby forming a suspension of a dyed finely divided hardened resin, separating the hardened resin from the suspension, water-washing and drying the resin, and thereafter crushing same into finely divided particles.

9. A finely divided hardened resin powder produced by a process of claim 5.

* * * * *

UNITED STATES PATENT OFFICE
CERTIFICATE OF CORRECTION

Patent No. 3,945,980  Dated March 23, 1976

Inventor(s) TSUBAKIMOTO, ET AL.

It is certified that error appears in the above-identified patent and that said Letters Patent are hereby corrected as shown below:

Item 73, line 1, delete "Kazaku", insert -- Kagaku --

Signed and Sealed this

Twenty-first Day of September 1976

[SEAL]

Attest:

RUTH C. MASON
Attesting Officer

C. MARSHALL DANN
Commissioner of Patents and Trademarks